United States Patent Office 3,030,290
Patented Apr. 17, 1962

3,030,290
PROCESS FOR MAKING THE SURFACES OF FLUOROCARBON POLYMERS CEMENTABLE
Dennis Leo Ryan, Jr., Wilmington, Del., assignor to E. I. du Pont de Nemours and Company, Wilmington, Del., a corporation of Delaware
No Drawing. Filed Aug. 7, 1958, Ser. No. 753,632
7 Claims. (Cl. 204—169)

This invention relates to a method of bonding perfluorocarbon resins to themselves or to other substrates by means of conventional adhesives.

Various procedures have heretofore been developed for bonding perfluorocarbon resins such as polytetrafluoroethylene. One of these procedures involves heating the perfluorocarbon resin under pressure to a temperature above its crystalline melting point in order to effect bonding. Such heating is in some cases impractical because of the difficulty of achieving the uniform heat and pressure necessary to obtain a sound bond. Another procedure is to prepare a perfluorocarbon resin article with a porous surface which is mechanically cementable. Such a porous surface may be prepared by covering a layer of presintered granular powder with virgin powder, compressing the mass, and sintering the compressed mass to obtain a shaped resinous article having one porous surface. This procedure is complicated by the preparation of the resinous article, and accordingly, is somewhat expensive. A more recently developed procedure involves treating the surface of the resinous article with an alkali metal, preferably dissolved in liquid anhydrous ammonia, and thereafter bonding the treated surface to another surface by means of an adhesive. This procedure yields a surface which can be bonded with conventional adhesives at temperatures below the crystalline melting point of the resin, but the procedure is sometimes undesirable because of the difficulties of handling alkali metals, or because the treatment blackens the surface of the article treated.

It is an object of the present invention to provide an improved method of bonding perfluorocarbon resins to themselves and to other surfaces. More specifically, it is an object of this invention to provide a novel, inexpensive, safe procedure for rendering the surface of a perfluorocarbon resin cementable, and thereafter bonding the treated surface.

According to the present invention, it has been found that these objects may be achieved by a procedure which comprises subjecting a piece of perfluorocarbon resin to the action of a corona discharge to produce a cementable surface on said perfluorocarbon. Such treatment is continued for a period of time sufficient to modify the surface characteristics of the perfluorocarbon, and is followed by applying an adhesive-coated surface to a cementable surface of another article. It is to be understood that a "corona discharge" is not necessarily visible to the eye, and accordingly it may be defined as any electrically detectable, field-intensified ionization that does not result immediately in complete breakdown of the insulation-electrode system in which the ionization occurs. A discharge that produces an arc or sparking is therefore eliminated from such a definition. The pressure of the atmosphere in which the corona discharge is formed is not critical although lower voltages are effective to produce corona discharge at the lower pressure. Subatmospheric pressures, therefore, may be employed with low voltages and are ordinarily preferred.

In the preferred process of this invention, the sample of perfluorocarbon to be treated is placed between two electrodes spaced apart sufficiently to provide a gap between the surface to be laminated and the electrode; and the sample is then subjected to a corona discharge at a voltage of at least 500 volts and for a sufficient time to provide at least 0.3 volt-hours per mil of thickness of the treated sample when treated at an absolute pressure of about 0.01 of mercury and at least 300 volt-hours per mil of thickness of the treated sample when treated at atmospheric pressure.

Most efficient operation is achieved at low pressures of 0.01 to 3 millimeters of mercury, using voltages of 500 to 1000 volts applied for a period of 15 to 300 seconds, and operation at such low pressures is particularly preferred in situations where they can conveniently be achieved.

The atmosphere present during the corona discharge treatment may be any gas in which a corona discharge can be produced, e.g., air, oxygen, nitrogen, hydrogen, and ammonia. However, using an atmosphere of hydrogen is especially advantageous, since this procedure provides an undiscolored cementable surface in a relatively short time. Using an atmosphere of anhydrous ammonia provides a blackened cementable surface in an even shorter time. It is therefore especially preferred to employ an atmosphere of either hydrogen or ammonia when operating at low pressures depending upon whether a discolored or an undiscolored surface is desired.

The adhesives employed in this process do not constitute a critical feature of the invention, and any suitable adhesive may be used, as for example, adhesives based upon epoxy resins, phenolic resins, polyester resins, cellulose ester resins, silicones, rubber, or the like.

The invention is more particularly described and explained by means of the following examples, which are illustrative. The test criterion in the following examples is called "peel strength," which may be described as the force required to peel one layer of the laminate away from the adjacent substrate divided by the length of the line of juncture where the two layers are separating. Thus, if it required 10 lbs. of force to peel a 2-inch strip from the substrate, the peel strength is 5 lbs./inch. In all cases, both sides of the perfluorocarbon resin treated are affected, but the side which faces the negative electrode during corona treatment is the most prominently affected. In the examples, the peel strengths reported are those developed upon that surface of the perfluorocarbon polymer which faced the negative electrode during treatment.

EXAMPLE I

A piece of polytetrafluoroethylene, 2 inches square and 10 mils in thickness, is placed between, and in contact with, two ½ inch diameter electrodes. A potential of 5000 volts for ½ hour is then applied across the electrodes, developing corona discharge without arcing or penetration of the polytetrafluoroethylene piece. The surface of the resin is not visibly affected, and the porosity of the resinous article is unchanged. After the treatment, an epoxy adhesive is applied to one of the surfaces of the polytetrafluoroethylene, a piece of copper sheet is placed on the exposed adhesive, and the adhesive is cured in the usual way. The resulting composite is found to be firmly bonded with a peel strength of 1–2 lbs. per inch at the circular area which was exposed to the corona discharge, but no bond is developed at the portion of the polytetrafluoroethylene resin surface outside the circular treated area.

EXAMPLE II

Strips of polytetrafluoroethylene 10 mils in thickness were placed between, and in contact with, two brass electrodes ½-inch in diameter. An electrical potential of 5000 volts was imposed across the electrodes for the times shown in Table I. After each exposure period, that strip was laminated to a strip of clean copper by means of a rigid epoxy cement (such as that sold by C. H. Biggs, Inc. under the code R–313). The laminates, after proper curing of the cement, were tested for a determination of the peel strength of the laminate. The results are shown below:

*Table I*

| Exposure time (hours): | Peel strength (lbs./in.) |
|---|---|
| 1.25 | 1–2 |
| 2.0 | 2 |
| 3.0 | 2–3 |

EXAMPLE II

Strips of polytetrafluoroethylene, 10 mils in thickness, were each supported on a piece of a copolymer of about 85 weight percent combined tetrafluoroethylene and 15 weight percent of combined hexafluoropropylene, and the latter was placed on the bottom one of two stainless steel electrodes, 1 inch in diameter and spaced 50 mils apart. This spacing of the electrodes left a 10-mil gap between the top electrode and the upper surface of the polytetrafluoroethylene strip being treated, thus permitting a broader area of treatment than the exact cross-sectional area of an electrode. The supporting pieces of copolymer were employed to avoid ill effects frequently suffered by polytetrafluoroethylene when it is subjected to high voltages. The treated strips were laminated to copper as described in Example 2 and tested for peel strength. The results are summarized below:

*Table II*

| Voltage Across Electrodes | Exposure Time | Peel Strength |
|---|---|---|
| 15,000 | 1 min | less than 1 oz./in. |
| 15,000 | 3 min | 1 oz./in. |
| 15,000 | 5 min | 2 oz./in. |
| 15,000 | 10 min | 6 oz./in. |
| 20,000 | 1 min | less than 2 oz./in. |
| 20,000 | 3 min | 2 oz./in. |
| 20,000 | 5 min | 4 oz./in. |
| 20,000 | 10 min | 15 oz./in. |
| 15,000 | 1 hr | 1–1.5 lbs./in. |
| 15,000 | 2 hr | 2–2.5 lbs./in. |
| 15,000 | 3 hr | 3 lbs./in. |

EXAMPLE 4

Samples of a fabric woven from polytetrafluoroethylene yarns were treated by a voltage discharge as described in the preceding examples and then laminated to a glass fiber fabric by the use of a rigid phenolic adhesive. The results are shown below:

*Table III*

| Voltage Across Electrodes | Exposure Time, minutes | Peel Strength |
|---|---|---|
| 15,000 | 1 | 1.25 lbs./in. |
| 15,000 | 3 | 1 lb./in. |
| 15,000 | 5 | 1.5 lbs./in. |
| Control laminate without electrical treatment | | 1–2 oz./in. |

EXAMPLE V

Strips of a 15/85 copolymer of hexafluoropropylene/tetrafluoroethylene were placed between electrodes 2 inches in diameter and having a radius of curvature of ¼ inch. The strips rested on the face of one electrode while the other electrode was 2½ to 5 mils above the surface of the copolymer strip being tested. A voltage sufficient to induce a corona discharge was imposed on the electrodes for various periods of time. After the treatment period the strip was coated with a thin layer of a modified synthetic rubber-type thermoplastic adhesive (sold by E. I. du Pont de Nemours & Co. as "4684" adhesive) and laminated to a strip of polyethylene terephthalate 1 mil in thickness. The laminated strip was then tested for peel strength, as described in the previous examples. An untreated laminate exhibited a peel strength of 0–1 lb./inch. The test results are indicated in Table IV.

*Table IV*

| Thickness, mils | Voltage, volts | Exposure Time, hours | Peel Strength (Lbs./In.) |
|---|---|---|---|
| 3 | 4,000 | 1 | 3–4 |
| 10 | 10,000 | ½ | 3–4 |
| 10 | 10,000 | ½ | 3–4 |

EXAMPLE VI

A strip of polytetrafluoroethylene 10 mils in thickness is supported between two electrodes about one inch apart. The assembly is placed within a bell jar and evacuated to an absolute pressure of about 0.2 millimeter/Hg. A potential of about 700 volts, sufficient to provide a corona discharge, is applied across the electrodes for 30 seconds. After the treatment, an epoxy adhesive is applied to the treated surface and the coated surface is laminated to a strip of clean copper. After curing the cement, the peel strength of the bond is 1.5–2 lbs. per inch. Upon repeating this experiment with the modification that the bell jar is flushed with hydrogen before final evacuation, a peel strength of 2.5–3 lbs. per inch is obtained. Upon further repeating this experiment with the modification that the bell jar is flushed with anhydrous ammonia before final evacuation, a peel strength of 3.5 to 4 lbs. per inch is obtained.

EXAMPLE VII

The procedures of Example VI are repeated employing exposure times of 180 seconds with air as the residual gas, 150 seconds with hydrogen as the residual gas, and 120 seconds with ammonia as the residual gas. In each case the strength obtained is 6–8 lbs. per inch.

I claim:
1. A process for making a shaped article of a perfluorocarbon resin cementable which comprises subjecting a surface of said article to the action of a corona discharge employing a voltage of at least 500 volts for a time sufficient to provide at least 0.3 volt-hours exposure per mil of thickness of said article at an absolute pressure of 0.01 mm. of mercury and at least 300 volt-hours exposure per mil of thickness of said article at atmospheric pressure.

2. A process according to claim 1 wherein said perfluorocarbon resin is polytetrafluoroethylene.

3. A process according to claim 1 wherein said perfluorocarbon resin is a copolymer of hexafluoropropylene and tetrafluoroethylene.

4. A process for making a shaped article of perfluorocarbon resin cementable which comprises subjecting a surface of said article to the action of corona discharge under an absolute pressure of 0.01 to 3 millimeters of mercury, employing a voltage of at least 500 volts, for a period of 15 to 300 seconds per 10 mils of thickness of said articles.

5. A process according to claim 4 wherein the subjecting corona discharge is carried out in an atmosphere of hydrogen.

6. A process according to claim 4 wherein the subjecting corona discharge is carried out in an atmosphere of anhydrous ammonia.

7. A process according to claim 6 wherein the absolute pressure is about 0.2 millimeter of mercury.

References Cited in the file of this patent

UNITED STATES PATENTS

| | | |
|---|---|---|
| 2,632,921 | Kreidl | Mar. 31, 1953 |
| 2,656,297 | Davis | Oct. 20, 1953 |
| 2,810,933 | Pierce | Oct. 29, 1957 |
| 2,859,480 | Berthold | Nov. 11, 1958 |
| 2,859,481 | Kaghan | Nov. 11, 1958 |
| 2,864,755 | Rothacker | Dec. 16, 1958 |
| 2,923,964 | Plonsky | Feb. 9, 1960 |

FOREIGN PATENTS 722,875   Great Britain _____ Feb. 2, 1955

OTHER REFERENCES

Modern Plastics, pages 105, 106, 108 and 205, July 1955.